US012610192B2

(12) United States Patent
Ni et al.

(10) Patent No.: US 12,610,192 B2
(45) Date of Patent: Apr. 21, 2026

(54) POLE PLATE AND SPEAKER

(71) Applicant: AAC Microtech (Changzhou) Co., Ltd., Changzhou (CN)

(72) Inventors: Siyuan Ni, Changzhou (CN); Jingwei Yu, Changzhou (CN); Zhongfeng Gao, Changzhou (CN); Qibo Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 328 days.

(21) Appl. No.: 18/334,362

(22) Filed: Jun. 13, 2023

(65) Prior Publication Data

US 2024/0298115 A1 Sep. 5, 2024

Related U.S. Application Data

(63) Continuation of application No. PCT/CN2023/090362, filed on Apr. 24, 2023.

(30) Foreign Application Priority Data

Mar. 2, 2023 (CN) ........................ 202320371958.6

(51) Int. Cl.
*H04R 9/02* (2006.01)
*H01F 7/08* (2006.01)

(52) U.S. Cl.
CPC ............... *H04R 9/02* (2013.01); *H01F 7/081* (2013.01)

(58) Field of Classification Search
CPC .................................. H04R 9/02; H01F 7/081
See application file for complete search history.

(56) References Cited

U.S. PATENT DOCUMENTS

2020/0413184 A1* 12/2020 Zhang .................... H05K 1/189

FOREIGN PATENT DOCUMENTS

CN 111093138 A * 5/2020 ............... H04R 7/02

* cited by examiner

*Primary Examiner* — Fan S Tsang
*Assistant Examiner* — Tyler Michael Liebgott
(74) *Attorney, Agent, or Firm* — Wiersch Law Group

(57) ABSTRACT

A pole plate includes first to third pole pieces formed into one piece. The second pole piece has grooves respectively formed in edges of two long sides of a first surface. Since a ratio of a width of the groove to a width of the pole plate falls between 0 and 0.15, the width of the groove is far smaller than the width of the pole plate. In a width direction of the pole plate, there is a long distance between the two grooves, as well as long distances from a middle of the second pole piece to the two grooves. Therefore, when the two grooves are machined, extrusion on the middle position of the second pole piece can be effectively reduced, and the middle position of the second pole piece is not broken for the extrusion, which does not waste machining cost and improves a machining efficiency.

5 Claims, 5 Drawing Sheets

POLE PLATE AND SPEAKER

TECHNICAL FIELD

The disclosure belongs to the technical field of electro-acoustic conversion, and particularly relates to a pole plate and a speaker.

BACKGROUND

As a frequently used electro-acoustic transducer, a speaker has been widely applied to smart mobile devices. In a related art, the speaker includes a frame, a vibration unit, and a magnetic circuit unit. The magnetic circuit unit includes a magnet and a pole plate fixed with the magnet. Usually, the speaker further includes two connectors. Grooves are respectively formed in two sides of the pole plate. The connectors each include one end fixed to the groove and the other end fixed to the frame. Therefore, the magnetic circuit unit is fixed with the frame. However, the pole plate in the related art is made of steel by extrusion. When the grooves are machined, a middle region connecting the two grooves is extruded and becomes progressively thin, until the pole plate is broken. This easily causes a waste of machining cost and so on.

SUMMARY

In the related art, when a core plate is formed by extrusion, a middle region connecting two grooves is extruded and becomes progressively thin, until the pole plate is broken. This easily causes a waste of raw materials, machining cost and so on. In view of the technical problem, an objective of the disclosure is to provide a pole plate.

The disclosure provides a pole plate. The pole plate includes a first pole piece, a second pole piece connected to the first pole piece, and a third pole piece connected to a side of the second pole piece away from the first pole piece. The pole plate has a first surface and a second surface opposite to the first surface. The second pole piece has grooves respectively located at edges of two long sides of the first surface and recessed from the first surface to the second surface. A ratio of a width of one groove of the grooves to a width of the pole plate falls between 0 and 0.15. A thickness of the groove is less than or equal to a half of a thickness of the pole plate.

As an improvement, the ratio of the width of the groove to the width of the pole plate falls between 0 and 0.125.

As an improvement, a ratio of a length of the groove to a length of the pole plate falls between 0 and 0.15.

As an improvement, the ratio of the length of the groove to the length of the pole plate falls between 0 and 0.10.

As an improvement, the second pole piece further includes two avoiding notches each penetrating through the first surface and the second surface and respectively communicating with outer sides of the grooves.

The disclosure provides a speaker. The speaker includes a frame, a vibration unit fixed to the frame, and a magnetic circuit unit fixed to the frame and configured to drive the vibration unit to vibrate. The magnetic circuit unit includes a magnet fixed to the frame, a pole plate fixedly attached to the magnet, and a connector having one end fixed to the groove and another end fixed to the frame. The pole plate includes a first pole piece, a second pole piece connected to the first pole piece, and a third pole piece connected to a side of the second pole piece away from the first pole piece. The pole plate has a first surface and a second surface opposite to the first surface. The second pole piece has grooves respectively located at edges of two long sides of the first surface and recessed from the first surface to the second surface. A ratio of a width of one groove of the grooves to a width of the pole plate falls between 0 and 0.15. A thickness of the groove is less than or equal to a half of a thickness of the pole plate As an improvement, the connector includes a first connecting piece fixedly attached to the groove, a second connecting piece parallel to the first connecting piece and fixedly attached to the frame, and a main body piece located between the first connecting piece and the second connecting piece and perpendicular to the first connecting piece. The first connecting piece and the second connecting piece are located at different sides of the main body piece, respectively. The main body piece is located in the one of the avoiding notches.

As an improvement, the ratio of the width of the groove to the width of the pole plate falls between 0 and 0.125.

As an improvement, a ratio of a length of the groove to a length of the pole plate falls between 0 and 0.15.

As an improvement, the ratio of the length of the groove to the length of the pole plate falls between 0 and 0.10.

As an improvement, the second pole piece further includes two avoiding notches each penetrating through the first surface and the second surface and respectively communicating with outer sides of the grooves.

The disclosure has the following beneficial effects.

According to the solutions, the pole plate is formed by extrusion. The pole plate is formed by a first pole piece, a second pole piece and a third pole piece that are formed into one piece. The pole plate has a first surface and a second surface that are opposite to each other. The second pole piece has grooves respectively located at edges of two long sides of the first surface and recessed from the first surface to the second surface. Since a ratio of a width of the groove to a width of the pole plate falls between 0 and 0.15, the width of the groove is far smaller than the width of the pole plate. In a width direction of the pole plate, there is a long perpendicular distance between the two grooves, as well as long distances from a middle position of the second pole piece to the two grooves. Therefore, when the two grooves are machined, extrusion on the middle position of the second pole piece can be effectively reduced, and the middle position of the second pole piece is not broken for the extrusion. In addition, since a thickness of the groove is less than or equal to a half of a thickness of the pole plate, thicknesses and widths to be machined for the two grooves are relatively small, thereby reducing extrusion time and the like. This can further reduce the extrusion on the middle position of the second pole piece in the machining of the groove, and can effectively ensure that the middle position of the second pole piece is not broken for the long-time extrusion. Compared with the related art, when the grooves are machined, the middle position of the second pole piece is not broken for the extrusion. The disclosure can effectively ensure a structural stability of the pole plate, does not waste machining cost and so on, makes the machining proceed smoothly, and improves a machining efficiency.

DETAILED DESCRIPTION OF EMBODIMENTS

The disclosure is further described below with reference to the drawings and implementations.

Figure 1:
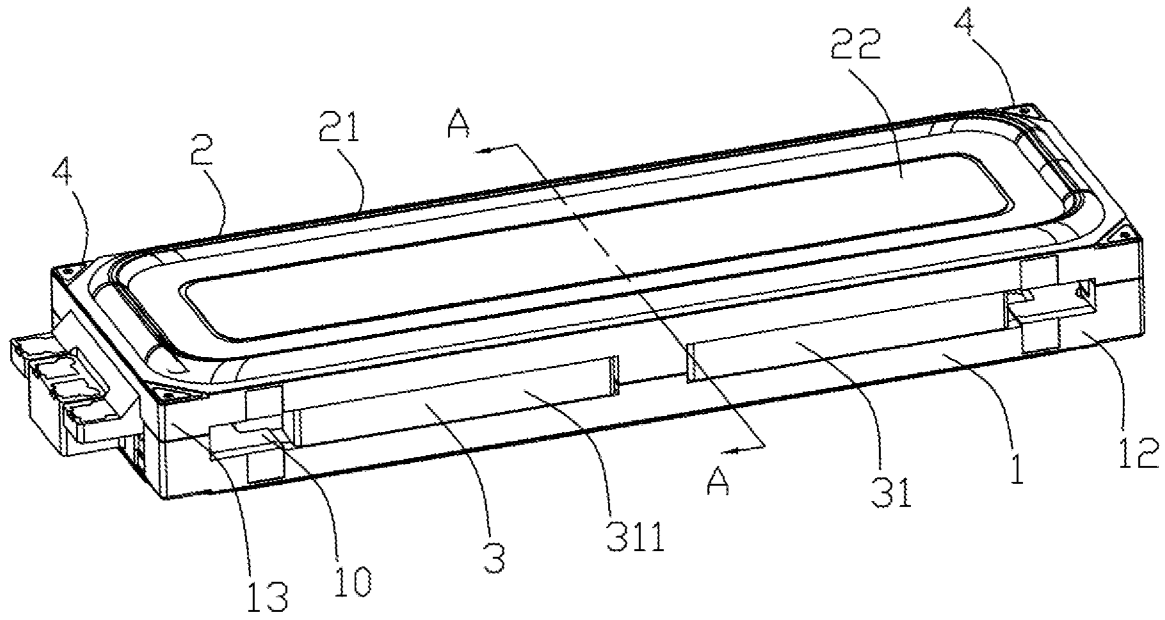
FIG. 1 is a perspective structural view of a speaker according to the disclosure.
Figure 2:
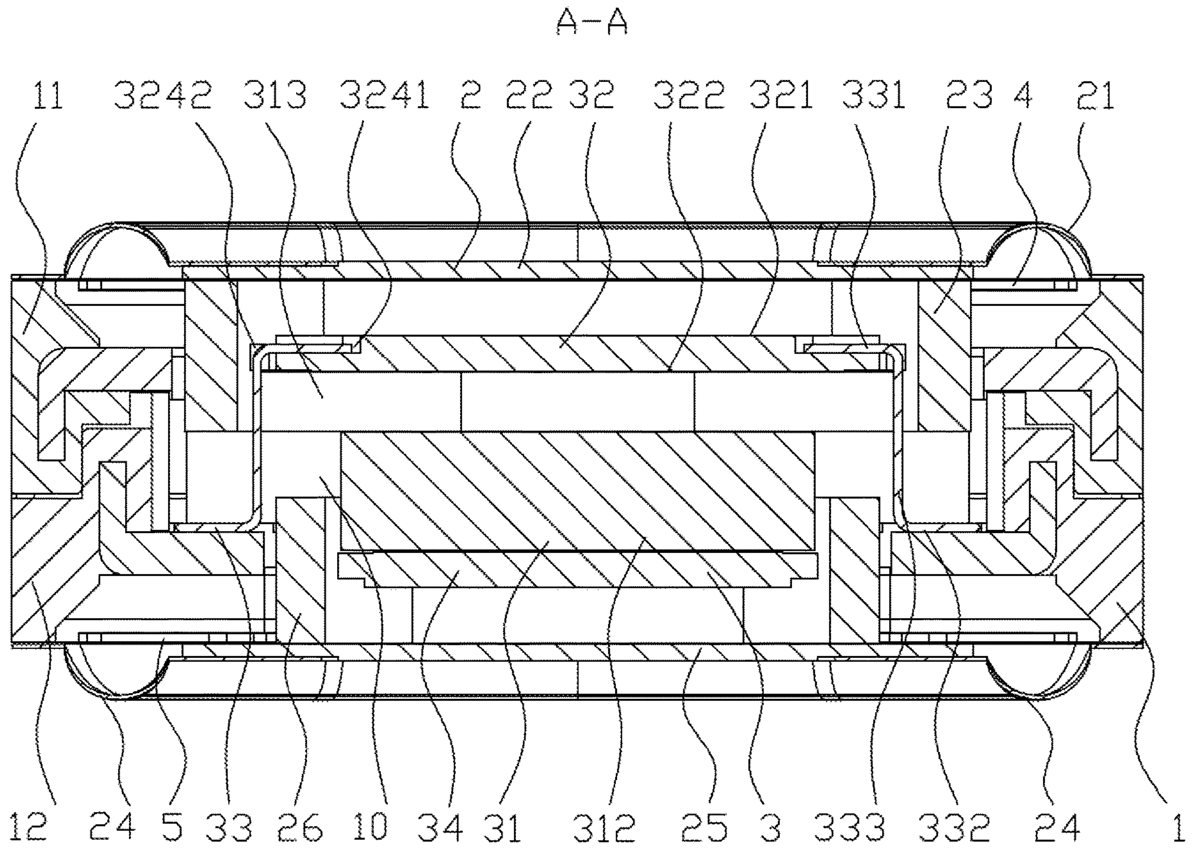
FIG. 2 is a sectional view of a speaker in a direction A-A shown in FIG. 1 according to the disclosure.
Figure 3:
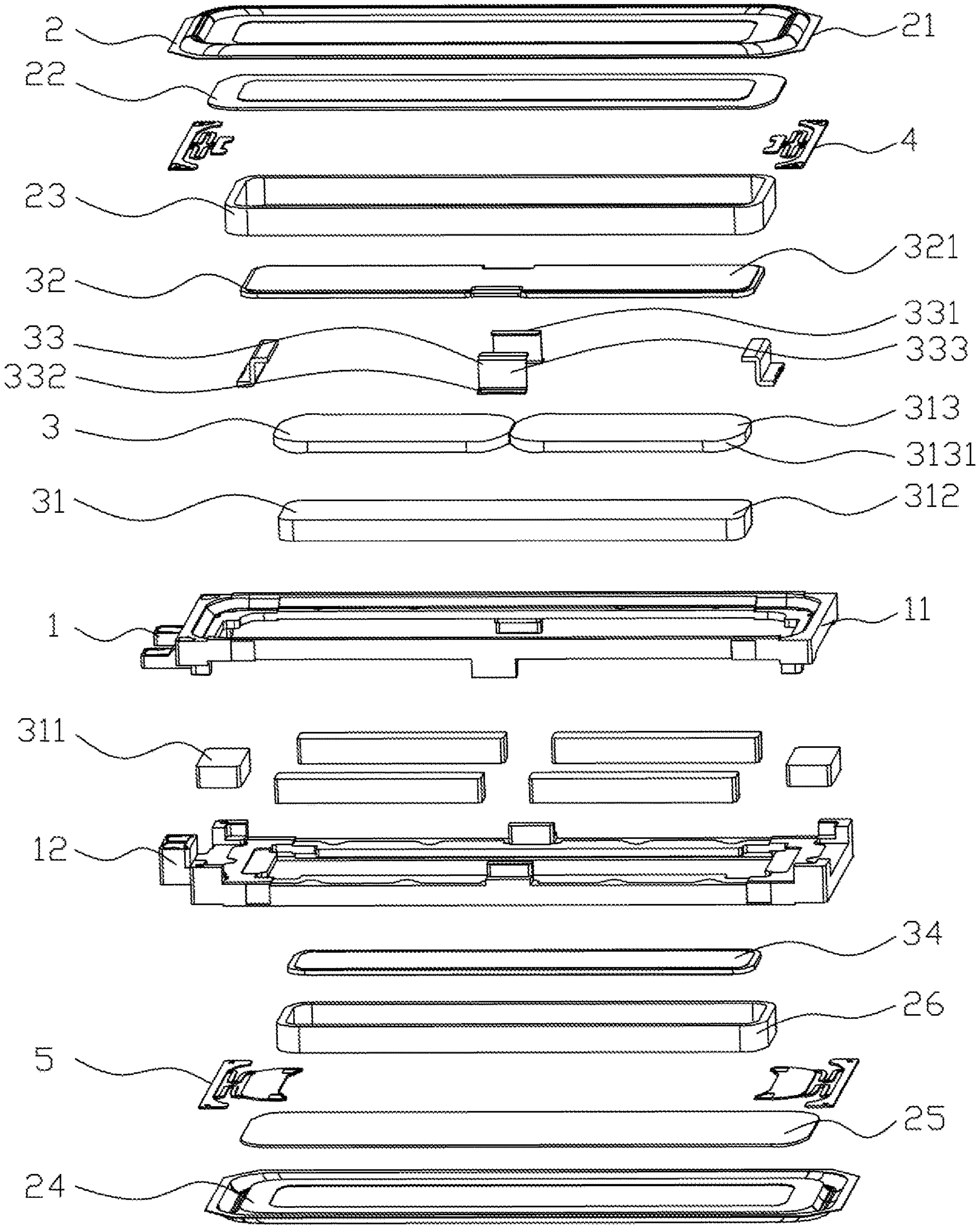
FIG. 3 is an exploded view of a speaker according to the disclosure.

Referring to FIGS. 1-3, a speaker includes a frame 1, a vibration unit 2 fixed to the frame 1, and a magnetic circuit unit 3 fixed to the frame 1 and configured to drive the vibration unit 2 to vibrate. The magnetic circuit unit 3 includes a magnet 31 fixed to the frame 1. The magnetic circuit unit 3 includes a pole plate 32 fixedly attached to the magnet 31, and a connector 33 having an end fixed to grooves 3241 and another end fixed to the frame 1.

Figure 4:
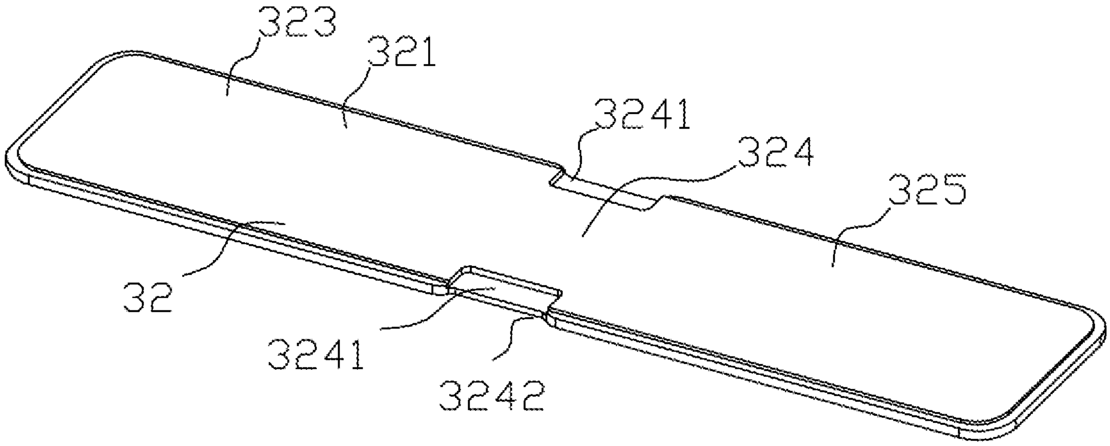
FIG. 4 is a structural view of a pole plate from a first viewing angle according to the disclosure.
Figure 5:
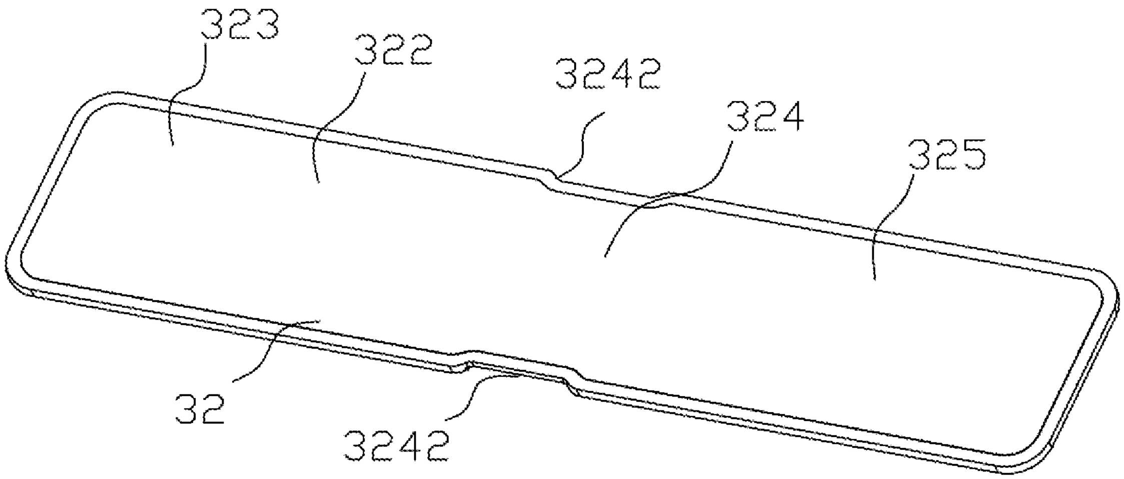
FIG. 5 is a structural view of a pole plate from a second viewing angle according to the disclosure.

Referring to FIG. 4 and FIG. 5, the pole plate 32 includes a first pole piece 323, a second pole piece 324 connected to the first pole piece 323, and a third pole piece 325 connected to a side of the second pole piece 324 away from the first pole piece 323. The pole plate 32 has a first surface 321 and a second surface 322 opposite to the first surface 321. The second pole piece 324 has grooves 3241 respectively located at edges of two long sides and recessed from the first surface 321 to the second surface 322. A ratio of a width of the groove 3241 to a width of the pole plate 32 falls between 0 and 0.15. A thickness of the groove 3241 is less than or equal to a half of a thickness of the pole plate 32.

In some embodiments, the frame 1 includes an upper frame 11 and a lower frame 12 that are opposite to each other. The upper frame 11 and the lower frame 12 define an accommodating cavity 10. The vibration unit 2 includes an upper diaphragm 21 fixed to the upper frame 11, an upper dome 22 connected to the upper diaphragm 21, an upper coil 23 connected to the upper dome 22, a lower diaphragm 24 fixed to the lower frame 12, a lower dome 25 connected to the lower diaphragm 24, and a lower coil 26 connected to the lower dome 25. The magnetic circuit unit 3 includes a magnet 31 fixed to the frame 1 (the magnet 31 includes an edge magnet 311 fixed between the upper frame 11 and the lower frame 12, a main magnet 312 spaced apart from the edge magnet 311 and fixed in the accommodating cavity 10, and an auxiliary magnet 313 fixedly attached to the main magnet 312), a main pole plate 34 fixedly attached to a side of the main magnet 312 away from the auxiliary magnet 313, and a pole plate 32 fixedly attached to a side of the auxiliary magnet 313 away from the main magnet 312. A first magnetic gap is formed between the auxiliary magnet 313 and the edge magnet 311. The upper coil 23 is located in the first magnetic gap. A second magnetic gap is formed between the main magnet 312 and the edge magnet 311. The lower coil 26 is located in the second magnetic gap. The auxiliary magnet 313 includes two sub-magnets 3131 connected in contact with each other and provided oppositely in a length direction of the pole plate 32. The magnetic circuit system 3 includes two connectors 33 respectively fixed to two grooves 3241. According to the solutions, the pole plate 32, the auxiliary magnet 313, the main magnet 312 and the main pole plate 34 are sequentially provided in the accommodating cavity 10. Through the connectors 33 with ends respectively fixed in the grooves 3241 of the pole plate 32 and the other ends fixed on the frame 1, the pole plate 32, the auxiliary magnet 313, the main magnet 312 and the main pole plate 34 can be indirectly fixed on the frame 1, thereby realizing an assembly stability of the speaker. On the other hand, in the length direction of the pole plate 32, the two sub-magnets 3131 are provided oppositely and connected in contact with each other. The two sub-magnets 3131 each include one side fixedly attached to the pole plate 32 and the other side fixedly attached to the main magnet 312. Therefore, through the two connectors 33 as well as the two grooves 3241 in the length direction of the pole plate 32, the two sub-magnets 3131 can be stably fixed between the pole plate 32 and the main magnet 312. This further ensures a connection stability of the two sub-magnets 3131 and further realizes the assembly stability of the speaker.

According to the solutions, the pole plate 32 is formed by extrusion. The pole plate 32 is formed by a first pole piece 323, a second pole piece 324 and a third pole piece 325 that are formed into one piece. The pole plate 32 has a first surface 321 and a second surface 322 that are opposite to each other. The second pole piece 324 has grooves respectively located at edges of two long sides of the first surface 321 and recessed from the first surface 321 to the second surface 322. Since a ratio of a width of the groove 3241 to a width of the pole plate 32 falls between 0 and 0.15, the width of the groove 3241 is far smaller than the width of the pole plate 32. In a width direction of the pole plate 32, there is a long perpendicular distance between the two grooves 3241, as well as long distances from a middle position of the second pole piece 324 to the two grooves 3241. Therefore, when the two grooves 3241 are machined, extrusion on the middle position of the second pole piece 324 can be effectively reduced, and the middle position of the second pole piece 324 is not broken for the extrusion. Since a thickness of the groove 3241 is less than or equal to a half of a thickness of the pole plate 32, thicknesses and widths to be machined for the two grooves 3241 are relatively small, thereby reducing extrusion time and the like. This can reduce the extrusion on the middle position of the second pole piece 324 in the machining of the groove 3241, and can effectively ensure that the middle position of the second pole piece 324 is not broken for the long-time extrusion. Compared with the related art, when the grooves 3241 are machined, the middle position of the second pole piece 324 is not broken for the extrusion. The speaker can effectively ensure a structural stability of the pole plate 32, does not waste machining cost and so on, makes the machining proceed smoothly, and improves a machining efficiency.

In some embodiments, referring to FIGS. 4-5, the ratio of the width of the groove 3241 to the width of the pole plate 32 falls between 0 and 0.125. In some embodiments, the pole plate 32 has the width of 7.54 mm, and the groove 3241 has the width of less than or equal to 0.92 mm.

In some embodiments, the pole plate 32 is made of a cold rolled carbon steel sheet and steel strip (SPCC-2DN) material. It is machined by extrusion. Therefore, no material is wasted, and the production cost can be controlled.

In an embodiment, the two grooves 3241 are respectively formed in middle positions of the two sides of the second pole piece 324. The second pole piece 324 is located at a middle position in the length direction of the pole plate 32. When the pole plate 32 is assembled to the device such as the speaker, the whole structure can be stressed uniformly to ensure the structural stability. In other embodiments, the two grooves 3241 can be formed in other positions of the second pole piece 324, namely the two grooves 3241 can be formed in other positions in the length direction of the pole plate 32.

In an embodiment, the pole plate 32 has the width of 7.54 mm, and the groove 3241 has the width of 0.92 mm. In the width direction of the pole plate 32, the width of the pole plate 32 is far greater than the width of the groove 3241. Since the two grooves 3241 are respectively formed in the edges of the two opposite sides of the second pole piece 324, there is a large distance between the two grooves 3241 in the width direction of the pole plate 32, as well as long distances from the middle position of the second pole piece 324 to the two grooves 3241. Therefore, when the two grooves 3241 are machined, the extrusion on the middle position of the second pole piece 324 can be effectively reduced, and the middle position of the second pole piece 324 is not broken for the extrusion, thereby ensuring the structural stability of the pole plate 32. The pole plate 32 does not waste machining cost and so on, makes the machining proceed smoothly, and improves a machining efficiency.

In other implementations of the embodiment, the pole plate 32 has the width of 7.54 mm. The width of the groove 3241 may be set as 0.91 mm, 0.9 mm, 0.88 mm, 0.85 mm, 0.82 mm, or 0.8 mm.

In other embodiments, the width of the pole plate 32 may be set as 7.52 mm, 7.55 mm, 7.58 mm, 7.62 mm, 7.65 mm, or 7.68 mm. Correspondingly, the width of the groove 3241 is set adaptively, provided that the ratio of the width of the groove 3241 to the width of the pole plate 32 falls between 0 and 0.125. In some embodiments, referring to FIGS. 4-5, a ratio of a length of the groove 3241 to a length of the pole plate 32 falls between 0 and 0.15. In some embodiments, a ratio of the length of the groove 3241 to the length of the pole plate 32 falls between 0 and 0.10.

In some embodiments, the pole plate 32 has the length of 32.24 mm, and the groove 3241 has the length of 3.2 mm. In order to ensure a connection stability between the groove 3241 of the pole plate 32 and the connector 33 when the pole plate 32 is assembled on the device such as the speaker, the groove 3241 needs to have a certain size. The groove 3241 has the length of 3.2 mm, which ensures the small width and thickness of the groove 3241 and the large distance between the two grooves 3241 in the width direction of the pole plate 32, reduces the extrusion on the middle position of the second pole piece 324, and guarantees the structural strength of the pole plate 32. Meanwhile, when the groove 3241 has the length of 3.2 mm and the pole plate 32 has the length of 32.24 mm, the pole plate 32 is not broken for extrusion on other positions in the length direction in machining of the groove 3241, or even the impact on the pole plate can be ignored, which ensures the stability of the whole structure of the pole plate 32 in the machining.

It is to be understood that the pole plate 32 is formed by extrusion. The pole plate 32 is integrally formed by the first pole piece 323, the second pole piece 324 and the third pole piece 325, namely the length of the pole plate 32 is a sum of a length of the first pole piece 323, a length of the second pole piece 324 and a length of the third pole piece 325. There is no limit to the length of the first pole piece 323, the length of the second pole piece 324, and the length of the third pole piece 325, provided that the length of the second pole piece 324 is greater than or equal to the length of the groove 3241.

In other implementations of the embodiment, the ratio of the length of the groove 3241 to the length of the pole plate 32 may be set as 0.06, 0.065, 0.07, 0.075, 0.08, or 0.09 specifically. In some embodiments, the length of the groove 3241 may be set as 3.15 mm, 3.1 mm, 3.05 mm, 3.00 mm, 2.98 mm, 2.95 mm, or 2.9 mm.

In other embodiments, the length of the pole plate may be set as 31.98 mm, 32.00 mm, 32.12 mm, 32.26 mm, 32.32 mm, 32.36 mm, or 32.40 mm. Correspondingly, the length of the groove 3241 is set adaptively, provided that the ratio of the length of the groove 3241 to the length of the pole plate 32 falls between 0 and 0.15.

Referring to FIGS. 4-5, in some embodiments, the pole plate 32 has the thickness of 0.4 mm, and the groove 3241 has the thickness of 0.2 mm. Because of the small thickness of the groove 3241, the extrusion time and the like can be reduced in the machining of the groove 3241, which can further reduce the extrusion on the middle position of the second pole piece 324 in the machining of the groove 3241 and ensures that the middle position of the second pole piece 324 is not broken for the long-time extrusion.

In other implementations of the embodiment, the pole plate 32 has the thickness of 0.4 mm. The thickness of the groove 3241 may be 0.195 mm, 0.19 mm, 0.185 mm, 0.18 mm, or 0.175 mm. In other embodiments, the thickness of the pole plate 32 may be set as 0.35 mm, 0.36 mm, 0.38 mm, 0.42 mm, 0.43 mm, 0.44 mm, 0.45 mm, or 0.46 mm. Correspondingly, the thickness of the groove 3241 is set adaptively, provided that the thickness of the groove 3241 is less than or equal to a half of the thickness of the pole plate 32.

In some embodiments, referring to FIG. 2, FIG. 4, and FIG. 5, the second pole piece 324 includes two avoiding notches 3242 penetrating through the first surface 321 and the second surface 322 and respectively communicating with outer sides of the grooves 3241. In some embodiments, referring to FIGS. 1-5, the connector 33 of the speaker includes a first connecting piece 331 fixedly attached to the groove 3241, a second connecting piece 332 parallel to the first connecting piece 331 and fixedly attached to the frame 1, and a main body piece 333 located between the first connecting piece 331 and the second connecting piece 332 and perpendicular to the first connecting piece 331. The first connecting piece 331 and the second connecting piece 332 are located at different sides of the main body piece 333. The main body piece 333 is located in the avoiding notch 3242. The main body piece 333 of the connector 33 includes one side facing the main magnet 312 and the auxiliary magnet 313, and another side facing toward the edge magnet 311.

In some embodiments, the grooves 3241 and the avoiding notches 3242 are located at the middle positions in the length direction of the pole plate 32. The two avoiding notches 3242 are respectively and oppositely formed in edges of two sides of the pole plate 32. The avoiding notches 3242 communicate with the grooves 3241 correspondingly. In response to assembly of the pole plate 32 on the device such as the speaker, when the first connecting piece 331 of the connector 33 of the speaker is attached to the groove 3241, the main body piece 333 of the connector 33 is fixed at the avoiding notch 3242, which makes the assembly stable and simplifies the assembly process. Meanwhile, the first connecting piece 331 of the connector 33 is fixed to the groove 3241, and the second connecting piece 332 is fixed to the lower frame 12. Consequently, the main magnet 312, the auxiliary magnet 313, the main pole plate 34 and the pole plate 32 are indirectly fixed on the upper frame 11 and the lower frame 12, thereby realizing the assembly stability of the speaker.

In some embodiments, referring to FIGS. 1-3, the speaker includes an upper PCB 4 fixed to the upper frame 11 and electrically connected to an upper voice coil, and an upper PCB 4 fixed to the lower frame 12 and electrically connected to a lower voice coil.

The above described are merely implementations of the disclosure. It should be noted here that those of ordinary skill in the art may make improvements without departing from the concept of the disclosure, but such improvements should fall within the protection scope of the disclosure.

What is claimed is:

1. A speaker, comprising a frame, a vibration unit fixed to the frame, and a magnetic circuit unit fixed to the frame and configured to drive the vibration unit to vibrate, wherein the magnetic circuit unit comprises a magnet fixed to the frame, a pole plate fixedly attached to the magnet, and a connector having one end fixed to the groove and another end fixed to the frame, wherein the pole plate has a first surface and a second surface opposite to the first surface and comprises:

a first pole piece, a second pole piece connected to the first pole piece, wherein the second pole piece has grooves respectively located at edges of two long sides of the first surface and recessed from the first surface to the second surface, and a third pole piece connected to a side of the second pole piece away from the first pole piece, wherein the connector comprises a first connecting piece fixedly attached to the groove a second connecting piece parallel to the first connecting piece and fixedly attached to the frame, and a main body piece located between the first connecting piece and the second connecting piece and perpendicular to the first connecting piece wherein the first connecting piece and the second connecting piece are located at different sides of the main body piece, respectively, and the main body piece is located in one of the avoiding notches;

wherein a ratio of a width of one groove of the grooves to a width of the pole plate is W, where $0<W\leq 0.15$, and a thickness of the groove is less than or equal to a half of a thickness of the pole plate.

2. The speaker as described in claim 1, wherein W satisfies the following condition: $0<W\leq 0.125$.

3. The speaker as described in claim 1, wherein a ratio of a length of the groove to a length of the pole plate is L, where $0<L\leq 0.15$.

4. The speaker as described in claim 3, wherein L satisfies the following condition: $0<L\leq 0.10$.

5. The speaker as described in claim 1, wherein the second pole piece further comprises two avoiding notches each penetrating through the first surface and the second surface and respectively communicating with outer sides of the grooves.

* * * * *